United States Patent
Rotter

(10) Patent No.: US 10,513,385 B2
(45) Date of Patent: Dec. 24, 2019

(54) VACUUM INSULATION ELEMENT, VACUUM INSULATED PACKAGING, AND VACUUM INSULATED CASE

(71) Applicant: Thomas Rotter, Hochheim-Massenheim (DE)

(72) Inventor: Thomas Rotter, Hochheim-Massenheim (DE)

( * ) Notice: Subject to any disclaimer, the term of this patent is extended or adjusted under 35 U.S.C. 154(b) by 0 days.

(21) Appl. No.: 15/483,508

(22) Filed: Apr. 10, 2017

(65) Prior Publication Data

US 2017/0291754 A1    Oct. 12, 2017

(30) Foreign Application Priority Data

Apr. 8, 2016 (EP) .................................. 16164474

(51) Int. Cl.
| | | |
|---|---|---|
| *B32B 3/28* | (2006.01) | |
| *B65D 81/38* | (2006.01) | |
| *B32B 27/10* | (2006.01) | |
| *F25D 3/00* | (2006.01) | |
| *F16L 59/065* | (2006.01) | |
| *E04B 1/80* | (2006.01) | |
| *B32B 27/30* | (2006.01) | |

(52) U.S. Cl.
CPC ............ *B65D 81/3823* (2013.01); *B32B 3/28* (2013.01); *B32B 27/10* (2013.01); *B65D 81/386* (2013.01); *B65D 81/3862* (2013.01); *F25D 3/00* (2013.01); *B32B 27/302* (2013.01); *B32B 2307/304* (2013.01); *E04B 1/803* (2013.01); *F16L 59/065* (2013.01); *F25D 2201/14* (2013.01); *Y10T 428/231* (2015.01)

(58) Field of Classification Search
CPC ...... Y10T 428/231; F16L 59/065; E04B 1/803
See application file for complete search history.

(56) References Cited

U.S. PATENT DOCUMENTS

| | | | |
|---|---|---|---|
| 1,780,739 A * | 11/1930 | Berg ...................... | F25D 23/06 |
| | | | 156/210 |
| 4,579,756 A * | 4/1986 | Edgel ...................... | B32B 3/28 |
| | | | 428/34 |
| 4,718,958 A | 1/1988 | Kugelmann, Sr. | |
| 4,862,674 A | 9/1989 | Lejondahl et al. | |

(Continued)

FOREIGN PATENT DOCUMENTS

| | | |
|---|---|---|
| DE | 3708569 A1 | 10/1987 |
| EP | 2105047 A1 | 9/2009 |

(Continued)

OTHER PUBLICATIONS

European Search Report, Application No. 16164474.5-1605, Applicant Name: Thomas Rotter, dated Sep. 26, 2016.

(Continued)

*Primary Examiner* — Alexander S Thomas
(74) *Attorney, Agent, or Firm* — Reising Ethington PC

(57) ABSTRACT

The present disclosure concerns a vacuum insulation element in which a core in a vacuum-tight enclosure is evacuated, as well as vacuum insulated packaging and a vacuum insulated case, wherein the core is composed of one or more elements that have a shape-giving structure, which forms an insulation volume, which is evacuated in the enclosure. Where appropriate, a single step can also include vacuum-sealing the contents in the effective volume.

12 Claims, 8 Drawing Sheets

(56) References Cited

U.S. PATENT DOCUMENTS

| | | | | |
|---|---|---|---|---|
| 6,037,033 A * | 3/2000 | Hunter | ................... | B32B 3/28 |
| | | | | 428/72 |
| 8,927,084 B2 * | 1/2015 | Jeon | ................... | F16L 59/065 |
| | | | | 428/69 |
| 2002/0170265 A1 * | 11/2002 | Tokonabe | ............... | B32B 3/12 |
| | | | | 52/793.1 |

FOREIGN PATENT DOCUMENTS

| | | |
|---|---|---|
| EP | 2894113 A1 | 7/2015 |
| GB | 2493273 A | 1/2013 |
| WO | 9302853 | 2/1993 |
| WO | 2009118154 A1 | 10/2009 |

OTHER PUBLICATIONS

European Office Action, EP Serial No. 17159156.3-1009, Applicant: Thomas Rotter, dated Aug. 28, 2019.

* cited by examiner

VACUUM INSULATION ELEMENT, VACUUM INSULATED PACKAGING, AND VACUUM INSULATED CASE

TECHNICAL FIELD

The present disclosure concerns a vacuum insulation element in which a core in a vacuum-tight enclosure is evacuated, wherein the core consists, in particular, of cavity-forming plate elements, as well as vacuum insulated packaging and a vacuum insulated case.

BACKGROUND

A variety of applications require small and lightweight thermal insulators, in some cases for only a limited time. For instance, in modern-day online commerce, cheese, meat and other temperature-controlled goods are shipped. In the shipping of medicines, proof of temperature-controlled transport of temperature-sensitive medicines has been required for quite some time.

Nevertheless, no technically and economically optimal solutions are yet in use for these applications. Until now, such solutions as chests made of foamed polystyrene (Styropor®) have been used. However, they are costly and typically very bulky for the desired insulating effect. Moreover, disposal of foamed plastics is resource-intensive.

Insulated boxes with integrated vacuum insulation elements, such as are described in DE 10 322,764 A1, offer a better insulating effect. These vacuum insulation elements typically are made of porous material that is evacuated in a jacket. Boxes with these vacuum insulation elements are costly in their manufacture and resource-intensive in their disposal, however. In order to make up for this, therefore, such boxes are typically reused multiple times. Consequently, a return system is necessary in mail-order trade. Therefore, such a solution is not optimal for shipping of goods that tend to be small and/or inexpensive.

EP 1,475,486 describes vacuum insulation elements in which a flat thermal insulating plate made of foam, fiber material, or porous material is evacuated in a metal-coated enclosure.

The manufacture of such vacuum insulation elements requires special equipment, and is complicated and therefore costly. Moreover, disposal and recycling of the materials that are employed are also resource-intensive.

Vacuum insulation elements in the form of flat vacuum insulated panels are also of interest in the construction industry, since they can be made thinner than conventional thermal insulation such as, e.g., sheets of foamed polystyrene, with the same U value (thermal transmittance value).

GENERAL DESCRIPTION

The object of the present disclosure is therefore to provide a vacuum insulation element, vacuum insulated packaging and a vacuum-insulated case that can be manufactured economically and with little effort, and with which packaging of the goods requires little effort.

Another aspect of the object of the present disclosure is to provide a vacuum insulation element, vacuum insulated packaging and a vacuum-insulated case that can be easily and economically disposed of or recycled, so that disposable use, in particular, is acceptable in both economical and ecological terms.

Another aspect of the object of the present disclosure is to provide a vacuum insulation element, vacuum insulated packaging and a vacuum-insulated case that are light in weight.

Another aspect of the object of the present disclosure is to provide a vacuum insulation element, vacuum insulated packaging and a vacuum-insulated case that the user, when packaging the goods, can easily adapt to the goods to be packaged, and produce or assemble in-house.

The object of the present disclosure is attained by the subject matter of the independent claims. Various improvements of the present disclosure are defined in the dependent claims.

According to the present disclosure, a vacuum insulation element, in particular in the form of a vacuum insulation panel ("VIP"), is provided that includes or consists of a core and a flexible, vacuum-tight sheeting or foil enclosure. The core is encapsulated in the sheeting or foil enclosure in a vacuum-tight manner and evacuated, and is dimensionally stable at least to the extent that the core in the evacuated state maintains an evacuated insulation volume inside the sheeting or foil enclosure in opposition to the atmospheric pressure that presses on the sheeting or foil enclosure.

The core, in turn, is composed of a shaped part that consists of one or more plate elements.

In the case of one plate element (i), the cavities are formed by a shape-giving structure within the plate element and/or between recesses in the shape-giving structure of the plate element and the enclosure, and in the case of multiple plate elements (ii), the cavities are formed by a shape-giving structure within the plate elements, between the plate elements, and/or between recesses in the shape-giving structure of the plate element and the enclosure.

Unlike with classic vacuum insulated panels, in which the evacuated volume is maintained by compact, porous bodies or porous, pourable filler material, with the present disclosure the cavities in the shaped part are unfilled and the evacuated insulation volume maintained by the core is composed of the unfilled cavities. The shaped part alone, consisting of an arrangement, possibly interconnected, of the plate elements, provides the core with the necessary and adequate dimensional stability to withstand atmospheric pressure, namely without the cavities being filled with a material that can be evacuated or is porous. Said cavities are unfilled, which is to say hollow. In other words, the shaped part itself that is not filled with a material that can be evacuated or is porous, or the arrangement itself of plate elements that form the shaped part, provides the core with adequate dimensional stability to withstand the atmospheric pressure that presses on the sheeting or foil enclosure. The dimensionally stable shaped part accordingly forms a framework that withstands the atmospheric pressure that presses on the sheeting or foil enclosure, namely without the spaces in the framework being filled with a solid material.

The core in this design forms an insulation volume consisting of unfilled cavities, in particular inside and/or between the plate elements, wherein the insulation volume is maintained in the evacuated state by the core. These unfilled cavities communicate with one another at least during evacuation in order to be evacuated together within the enclosure.

Unlike with a compact, porous material, the shape-giving structure of the plate element or elements preferably contains for this purpose at least one three-dimensionally shaped layer that defines a plane in the first and second dimensions $(x, y)$ and is deformed such that the shape-giving structures extend in the dimension perpendicular (third dimension z) to the layer plane (x, y) so as to form cavities in a defined manner. This contouring of the layer can be a corrugated shape or a dimpled shape, for example. However, other shapes are also possible as long as cavities are created by the three-dimensional contouring of the thin layer. The defined cavities here preferably have a regular arrangement and are formed, in particular, by recesses, e.g., corrugation troughs or dimple recesses, of the three-dimensionally shaped layer on one side or on both sides of the layer due to the shaped structure of the layer. In other words, the three-dimensionally shaped layer is deformed, for example embossed, at right angles to the layer plane to create the recesses that form the cavities on both sides of the layer. The layer can thus be formed in corrugations or with dimples, for instance, in order to produce such recesses.

In other words, the plate elements accordingly contain at least one layer formed in the third dimension perpendicular to the layer plane. Expressed mathematically, the formed layer contains a plurality of curved, two-dimensional surface patches. Consequently, the recesses of the formed layers have curved surfaces, in particular local minima and maxima of the function $F(x,y)$ of the surface shape, where x and y define the first and second dimensions, which is to say the x-y plane in which the formed layer or the plate element predominantly extends. Or expressed in another way, $F(x,y) \neq$ constant for the macroscopic surface function of the formed layer.

Such a vacuum insulation element can be manufactured economically and with little effort, and secondly that it can be disposed of again or recycled in an economical and ecologically beneficial way. The plate element and/or the formed layer preferably are made of cardboard or plastic. Corrugated cardboard and dimpled membrane, for example, are especially suitable as a plate element that has a shape-giving structure. Dimpled membrane is available as embossed roll goods for wall drainage in the construction industry, for example.

In particular, the plate elements thus have a shape-giving structure in such a manner that at least some of the cavities are made by the shape-giving structure of a layer of the applicable plate element formed out of the layer plane into the third dimension. A simple example for this is corrugated cardboard. In corrugated cardboard, the corrugated layer, by means of its corrugation flutes formed out of the plate plane, makes cavities between the corrugated layer and the top or bottom liner, respectively.

An additional feature is the low weight. It is especially desirable that the plate elements as well as the enclosure can be freely assembled on site by the user himself so that the user can individually assemble the vacuum insulation element or vacuum insulation panel such that it is, for example, matched to the goods to be packaged or to other requirements in the application, for example shape, size, thickness, cut-outs, etc.

According to a preferred embodiment, the plate elements form a partition, in particular a grid-like, unfilled partition. For example, strips of the plate elements are joined together into an open grid. In the process, the unfilled partition is thus formed by the strips slotted together crosswise, wherein the spaces between the strips remain unfilled, which is to say hollow, i.e., in particular are not filled with, e.g., a porous material that can be evacuated or the like.

Testing has shown that, surprisingly, a shaped part made of strips of structural cardboard, for example corrugated cardboard or honeycomb cardboard, that have been slotted together crosswise already has sufficient stability to withstand atmospheric pressure after evacuation. For example, it has been demonstrated that a grid slotted together in a checkerboard pattern made of strips of corrugated cardboard with a B flute and lined on both sides, if applicable with cover plates and/or edge stabilization, is already sufficient to provide the shaped part with adequate dimensional stability.

The enclosure, in particular sheeting or foil enclosure, accordingly is preferably made of a plastic sheeting, but for simple applications could also be made of a coated paper. For example, one or more of the cavity-forming plate elements, such as, e.g., corrugated sheeting, dimpled membrane, corrugated cardboard, or honeycomb cardboard, are inserted in the sheeting or foil enclosure, which is implemented as a tube or bag made of plastic sheeting, and then are evacuated and sealed by means of a vacuum sealer such as is used for packaging foodstuffs, for example. In other words, the plastic sheeting or foil enclosure is implemented as a tube, for example, and in the evacuated state is heat-sealed shut on both sides of the core in order to define the evacuated volume.

The plastic sheeting or foil enclosure in which the plates are hermetically sealed does not necessarily have to be coated, for example metal-coated, however. It is also possible to metal-coat the plate elements of the core, or to reduce the absorption and emission of thermal radiation by means of a metallic insert. Because the vacuum does not need to hold for an especially long time, depending on the application, for example only a few days or weeks in the case of shipping of goods, it is possible to use economical, simple sheeting that does not remain airtight for long for these applications.

In contrast to conventional foamed polystyrene as insulating material, the vacuum insulation element according to the present disclosure has a smaller thickness (lower U value) for the same thermal insulation. Where appropriate, a thickness of one-eighth to one-tenth the thickness of a foamed plastic insulation can suffice.

For higher-quality applications, it is possible to evacuate one or more deformed plastic layers in a tube or bag. The plates are deformed such that they support the atmospheric pressure that occurs as well as the weight of the goods to be shipped, and transfer it to the adjacent plate with as few points of contact as possible. The thermal insulation effect can be further improved by this means.

Thus, if at least one of the plate elements is implemented as a shaped, for example embossed, deep-drawn or otherwise shaped, plastic layer, then the shaped plastic layer forms a plurality of recesses in one or both surfaces of the plastic layer, for example in the form of dimple recesses in a dimpled membrane. As already explained, dimpled membrane of this nature can be obtained economically as roll goods for wall drainage. Such roll goods can be stabilized with a more stable supplementary plate in order to improve shape retention during evacuation.

In the case of one plate element (i), the plate element is thus preferably implemented as a shaped plastic layer that defines a plurality of recesses, and the evacuated cavities are formed between the recesses of the plastic layer and the enclosure, and in the case of multiple plate elements (ii), at least one of the plate elements is implemented as a shaped plastic layer, and the evacuated cavities are formed between the recesses of the at least one shaped plastic layer and the enclosure, and/or between the at least one shaped plastic layer and the additional plate element/elements, which mutually support one another, spaced apart by the inward-facing recesses.

For example, the core can comprise at least two inversely shaped plastic layers that have opposing inward-facing recesses, for example inward-facing dimple recesses, which mutually support one another at points of support on the respective inner sides when the core is evacuated within the enclosure in order to apply the supporting force in opposition to atmospheric pressure.

According to one exemplary embodiment of the present disclosure, the shaped plastic layers can each have an edge region that can fit into one another and that mutually support one another in the evacuated state in order to form a surrounding edge closure of the two plastic layers that are fitted into one another.

In this design, it can be beneficial for the shaped plastic layers to contain openings in order to be better able to evacuate the interior region between the plastic layers.

The core can also include structural cardboards, however, which is to say that the plate element or elements preferably are implemented as structural cardboards. For example, corrugated cardboard or honeycomb cardboard are a possibility for this purpose, wherein, e.g., the inner corrugated layer of the corrugated cardboard defines the recesses in the form of corrugation troughs of the corrugated intermediate layer.

These plate elements accordingly preferably are made of paperboard material and are likewise arranged and assembled in terms of strength such that they can support atmospheric pressure as well as the weight of the contents.

The present disclosure accordingly also concerns the use of structural cardboard, for example corrugated cardboard or honeycomb cardboard, as a core of a vacuum insulation element evacuated in an enclosure.

The core can thus consist, in particular, of a plurality of structural cardboard sheets or shaped plastic layers, or of a combination thereof.

For disposal, the user can cut open the enclosure, using a sharp knife if it is made of plastic sheeting, for example, and remove the core if the core and the sheeting or foil enclosure are to be disposed of or recycled separately. This is especially desirable when corrugated cardboard or honeycomb cardboard are used, since they are made from waste paper and can go back into waste paper recycling, whereas the plastic sheeting of the sheeting or foil enclosure can go into plastic recycling.

Testing has shown that commercial corrugated cardboard and honeycomb cardboard can be stable enough to withstand atmospheric pressure of up to $10^5$ N/m$^2$, even in the case of large vacuum insulation elements.

To stabilize the core further, it can be desirable to use corrugated cardboard or honeycomb cardboard that is lined on both sides.

It is additionally desirable that the core can include multiple stacked layers of corrugated cardboard or honeycomb cardboard, wherein the corrugated cardboard layers preferably are laid crosswise.

According to a preferred embodiment of the present disclosure, the core can include an inner part made of one or more shaped plastic layers that are covered on one or both sides by one or two pieces of structural cardboard, in particular corrugated cardboard or honeycomb cardboard. In this design, the structural cardboard fulfills a dual function, acting firstly as a pressure relief and pressure distribution layer for the shaped plastic layers, and secondly, contributing on its own to increasing the evacuated insulation volume in the enclosure.

According to a preferred embodiment of the present disclosure, the core includes multiple stacked plates, in particular multiple layers of corrugated cardboard or honeycomb cardboard. Preferably, at least one of the layers has linear gaps such that the gaps form predefined fold lines. As a result, the vacuum insulation element can be folded into a three-dimensional spatial shape in a controlled manner at the predefined fold lines, namely if desired after insertion into the enclosure, in the non-evacuated state, and even in the evacuated state as well. This ensures a high degree of flexibility, for example for insertion into an outer shipping crate.

For certain applications, for example for thermal insulation of buildings, it can be desirable to insert a mounting strip in the enclosure on at least one face of the core, and to seal the enclosure between the core and the mounting strip. As a result, the vacuum within the core is maintained even when the vacuum insulation element is fastened in a manner involving penetration through the enclosure and the mounting strip, for example is screwed or nailed.

In an desired manner, the vacuum insulation element can be folded between the core and the at least one mounting strip without breaking the vacuum so that the fastening strip or strips can be bent at right angles, for example, and the vacuum insulation panel can be secured with screws at its face, for example between two parallel beams.

The vacuum insulation elements accordingly are suitable for producing vacuum insulated packaging to package goods for thermally controlled transport, but also for use in the construction industry, especially in the form of vacuum insulation panels, for example for thermal insulation of walls or between rafters.

Vacuum insulated packaging according to one aspect of the present disclosure comprises a core and a flexible vacuum-tight enclosure, in particular a sheeting or foil enclosure.

According to a preferred embodiment, the vacuum insulated packaging thus comprises a core or packaging core and a flexible vacuum-tight enclosure, wherein the packaging core forms an effective volume and an insulation volume surrounding the effective volume, wherein contents requiring temperature control are arranged in the effective volume, wherein the packaging core with the contents requiring temperature control is encapsulated in the enclosure in a vacuum-tight manner and evacuated, and the packaging core is dimensionally stable at least to the extent that, in the evacuated state, it maintains the evacuated insulation volume inside the enclosure in opposition to the atmospheric pressure that presses on the enclosure, and wherein the content requiring temperature control is evacuated together with the packaging core within the same enclosure and is thermally insulated by the evacuated insulation volume.

Preferably, a cold pack or a heat storage element is arranged in the effective volume inside the packaging core in addition to the contents requiring temperature control, and is evacuated together with the contents requiring temperature control and the packaging core within the same enclosure. This simplifies packaging and also saves costs.

According to one embodiment of the vacuum insulated packaging, the packaging core comprises a first and a second plate element, in particular as described above, for example made of a shaped plastic layer and/or structural cardboard, for example corrugated cardboard and/or honeycomb cardboard, and the contents requiring temperature control, if applicable together with the cold pack or the heat storage element, are arranged in a sandwich fashion between the first and second plate elements, and the contents requiring temperature control, if applicable together with the cold pack or the heat storage element, are evacuated together with the first and second plate elements within the same enclosure.

The vacuum insulated packaging according to the present disclosure is especially suitable for packaging temperature-sensitive medicines or foodstuffs. It is especially simple, in particular for contents with low thickness, such as, e.g., pre-portioned steaks, to arrange the contents requiring temperature control, if applicable together with the cold pack or the heat storage element, in a sandwich fashion between the first and second molded parts, which in this embodiment are implemented as the first or second plate elements. Here, the first and/or second plate elements can be flexible in design in order to curve tightly around the contents requiring temperature control, if applicable together with the cold pack or the heat storage element, on account of atmospheric pressure.

According to another embodiment of the vacuum insulated packaging, the packaging core comprises at least one molded plastic part and/or a plurality of stacked plate elements, in particular shaped plastic layers and/or structural cardboard, for example corrugated cardboard and/or honeycomb cardboard, which together form the effective volume and the insulation volume, wherein the content requiring temperature control, if applicable together with the cold pack or the heat storage element, is arranged such that it is surrounded by the at least one molded plastic part and/or the plate elements in the effective volume thus formed, and the effective volume thus formed is evacuated with the contents requiring temperature control, if applicable together with the cold pack or the heat storage element, and the arrangement consisting of the at least one molded plastic part and/or the plate elements is dimensionally stable at least to the extent that together it withstands on its own the atmospheric pressure that presses on the enclosure, and hence the evacuated effective volume is kept stable.

In this process, the contents requiring temperature control are arranged in the effective volume in the interior of the packaging core, if applicable with a cold pack or a heat storage element. Then, the packaging core with the contents requiring temperature control, and, if applicable, with a cold pack or a heat storage element, is encapsulated in the enclosure in a vacuum-tight manner and evacuated. In the case of molded plastic parts, they can be open on an outer side facing away from the contents. In this case it is useful to close the opening with a plate. In any case, the packaging core is dimensionally stable at least to the extent that, in the evacuated state, it maintains both the insulation volume and the effective volume inside the enclosure in opposition to the atmospheric pressure that presses on the enclosure.

In desirable fashion, the molded plastic part or parts or molded plastic halves are matched in shape to the product requiring temperature control, for example deep drawn, so that the effective volume jointly formed by the molded part or parts is implemented as the negative shape of the product requiring temperature control.

Even relatively complex vacuum insulated packages can be produced in this way. According to a preferred embodiment of the present disclosure, the packaging core accordingly comprises a layered construction of a plurality of plate elements, in particular sheets of corrugated cardboard or honeycomb cardboard, and these surround a predefined effective volume and form the evacuated insulation volume located around it, for example by means of the cavities within the corrugated cardboard or honeycomb cardboard. The contents requiring temperature control, if applicable together with the cold pack or the heat storage element, are arranged such that they are surrounded by the plate elements in the effective volume thus formed, and the effective volume thus formed is evacuated with the contents requiring temperature control, if applicable together with the cold pack or the heat storage element. In this design, the layered construction of plate elements is dimensionally stable at least to the extent that in the evacuated state it withstands atmospheric pressure on its own so that the evacuated effective volume is kept stable despite evacuation. In other words, the packaging core is dimensionally stable to the extent that the effective volume of the packaging core would be maintained even if it contained no contents, which is to say that atmospheric pressure in the evacuated state essentially does not press on the contents, since the atmospheric pressure is taken up by the packaging core that forms the effective volume. Vacuum insulated packaging of this nature is especially suitable for, e.g., thermally controlled transport of sensitive goods such as bottles, for example medicine vials with temperature-sensitive contents, for example vaccines or the like, especially made of glass.

A special feature of these embodiments of the present disclosure resides accordingly in the fact that the contents requiring temperature control within the packaging core consisting of a layered construction of plate elements and/or molded plastic parts forming evacuatable cavities are evacuated together with the packaging core within the same enclosure, and thus are packaged in a thermally insulated manner and simultaneously vacuum-sealed in the same step. As a result, the packaging can take place efficiently, and superfluous packaging steps and packaging components can be eliminated. Moreover, the contents requiring temperature control are themselves located in an evacuated environment, which can have a beneficial effect on the shelf life for some goods.

On the other hand, it is also possible with the inventive vacuum insulation elements or vacuum insulation panels, wherein the vacuum insulation panel or panels including the applicable evacuated enclosure are folded into a three-dimensional spatial shape, to construct box-shaped vacuum insulators that enclose a non-evacuated effective volume, such as is also the case with classic polystyrene boxes, for example. This embodiment has benefits when vacuum insulated packaging that is more universal is desired, for example to transport multiple different goods of variable forms.

Preferably, to this end a first and a second vacuum insulation panel, including the evacuated enclosure, are folded into a three-dimensional spatial shape and interlock in a bracketing manner to form a box-shaped vacuum insulator that encloses a non-evacuated effective volume.

For example, the first and second vacuum insulation elements, including the evacuated enclosure, can each be folded into a U-shape and then, rotated by 90°, interlock so that together they form a cuboid vacuum insulator that is closed on all sides.

Thus, it is possible using the vacuum insulation panels to construct more-or-less rectangular or cuboid hollow bodies, in particular, whose interior effective volume is not evacuated but is surrounded completely and on all sides by vacuum insulation layers. Where appropriate, however, it is also possible, using two vacuum insulation panels, to produce pouches in which contents requiring temperature control are placed.

The six sides of a cuboid vacuum insulator that is closed on all sides and thermally insulates the contents from all six sides can accordingly be composed, for example, of two vacuum insulation panels folded into a U-shape or of a thrice-folded vacuum insulation panel that forms four sides together with a top and bottom vacuum insulation panel.

In other words, multiple sides of a contour that will later form a cuboid are evacuated as one piece, so that a cuboid vacuum insulation package can be formed by means of one or more, but if applicable fewer than six, vacuum insulation panels, wherein the vacuum insulation panels can be folded in the evacuated state.

Furthermore, the vacuum insulated case can also include a non-evacuated inner box and/or a non-evacuated outer shipping box, made, for example, of corrugated cardboard or honeycomb cardboard, wherein the box-shaped or cuboid vacuum insulator is placed in the outer shipping box and/or the inner box is placed in the box-shaped insulator. This produces a packing case in the form of a vacuum insulated case with multi-layered walls consisting of the non-evacuated outer shipping box, the box-shaped or cuboid vacuum insulator, and the non-evacuated inner box, so that the box-shaped or cuboid vacuum insulator is protected from damage inside and/or outside by the non-evacuated inner box and/or the non-evacuated outer shipping box. This design can be desirable with respect to the shelf life and recyclability of the components of the vacuum insulated case.

In order to achieve improved acoustic insulation, the plate elements can be coated with a pressure-absorbing layer made, for example, of cork or fabric.

According to one aspect of the present disclosure, a vacuum insulation element is accordingly provided that comprises a core and a flexible, vacuum-tight sheeting or foil enclosure,
  wherein the core is encapsulated in the sheeting or foil enclosure in a vacuum-tight manner, and the sheeting or foil enclosure with the core is evacuated, and the core is dimensionally stable at least to the extent that, in the evacuated state, it maintains an evacuated insulation volume inside the sheeting or foil enclosure in opposition to the atmospheric pressure that presses on the sheeting or foil enclosure,
  wherein the evacuated insulation volume maintained by the core is composed of a plurality of unfilled cavities,
  wherein the core is composed of one or more plate elements that define a plate plane and have a shape-giving structure made of layers that are formed out of the plate plane into the third dimension perpendicular to the plate plane such that the layers perpendicular to the plate plane form raised areas and recesses on both sides, wherein the majority of the cavities are formed by the recesses in the shape-giving structure of the layers, and wherein the shape-giving structure of the layers provides the plate element or elements with adequate dimensional stability so that the shape-giving structure of the layers of the plate element or elements, in turn, provides the core with its dimensional stability to withstand atmospheric pressure without the cavities formed by the recesses being filled with a material that can be evacuated or is porous, but instead being unfilled, and
  wherein the arrangement made of the plate element or elements is not itself vacuum-tight, and the cavities formed by the recesses communicate with one another at least during evacuation in order to be evacuated together within the sheeting or foil enclosure.

Below, the present disclosure is explained in detail using exemplary embodiments and with reference to the figures, wherein identical and similar elements are in part labeled with identical reference numbers, and the features of the various exemplary embodiments can be combined with one another.

BRIEF DESCRIPTION OF THE FIGURES

Shown are.

* Translator's note: "büchsförmig" in the original German here is treated as a probable typo for "boxförmig"

Figure 16:
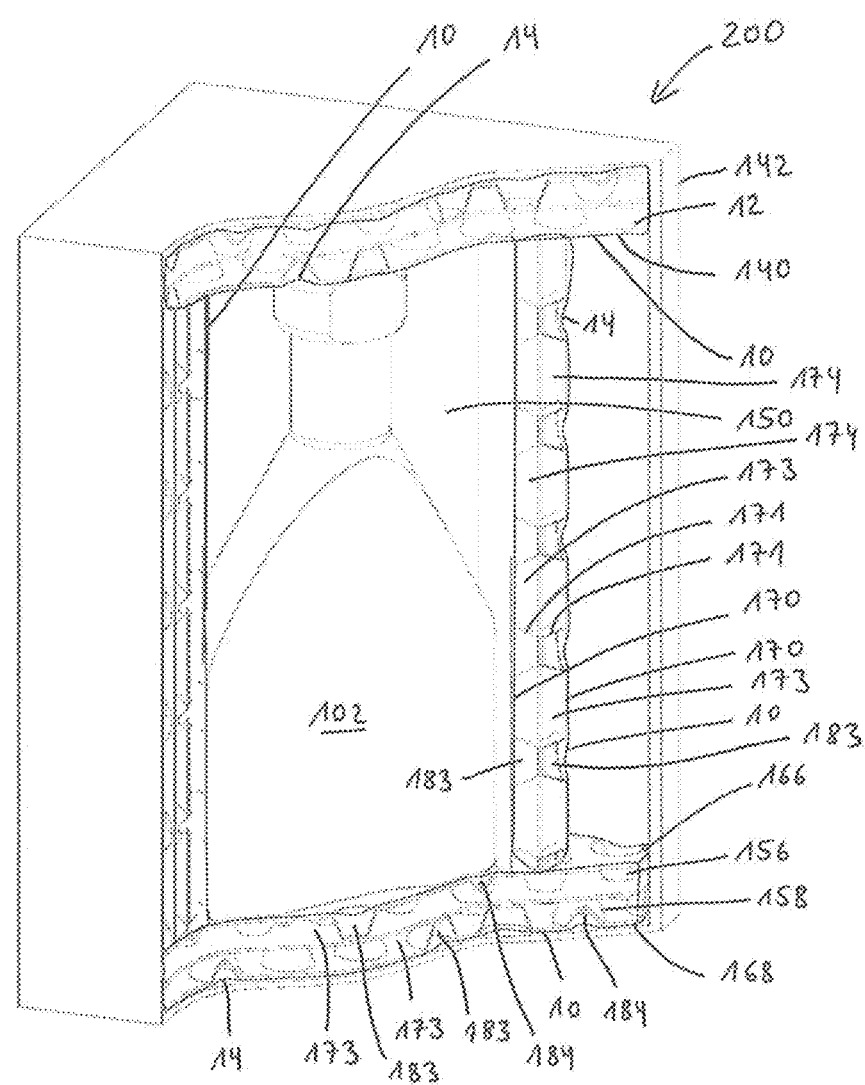
Figure 17:
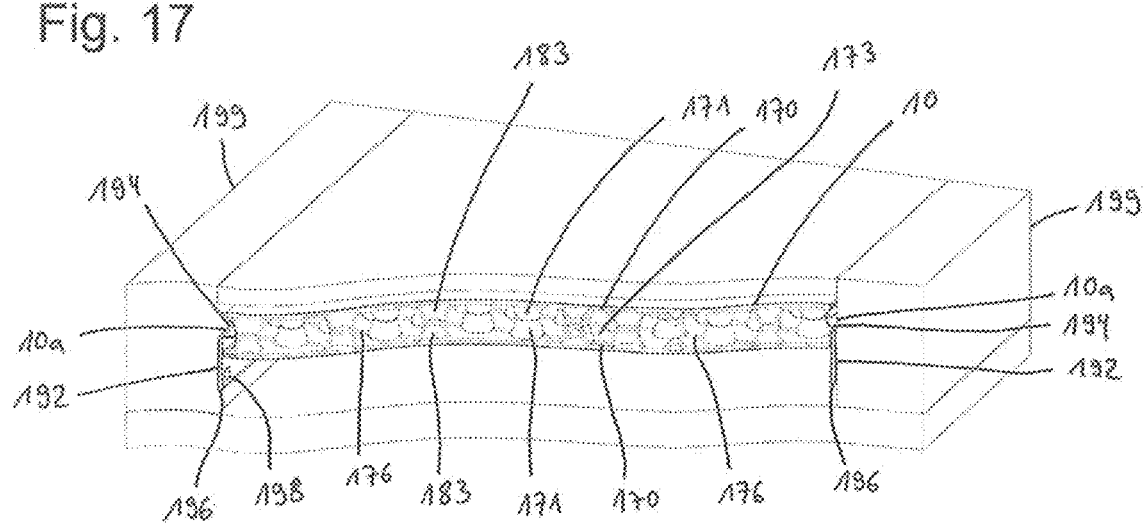
Figure 18:
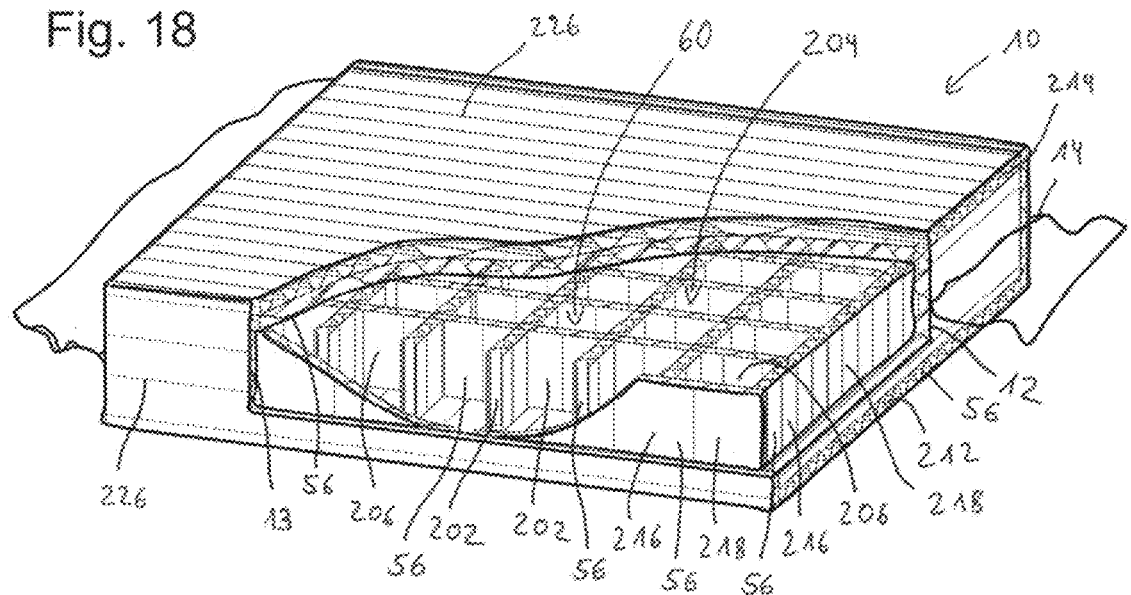
Figure 19:
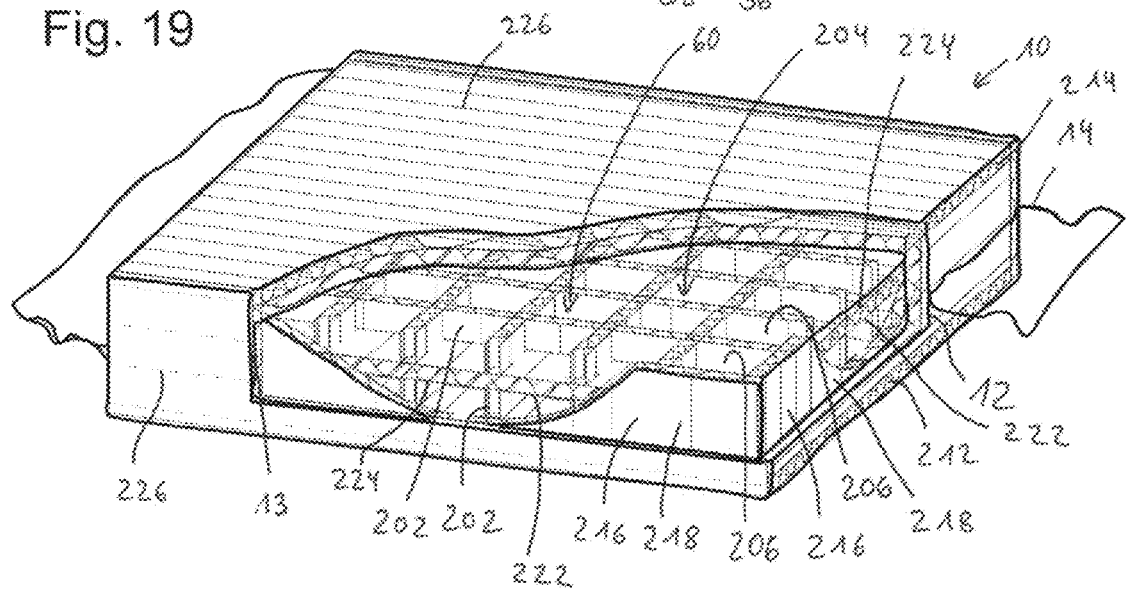
Figure 20:
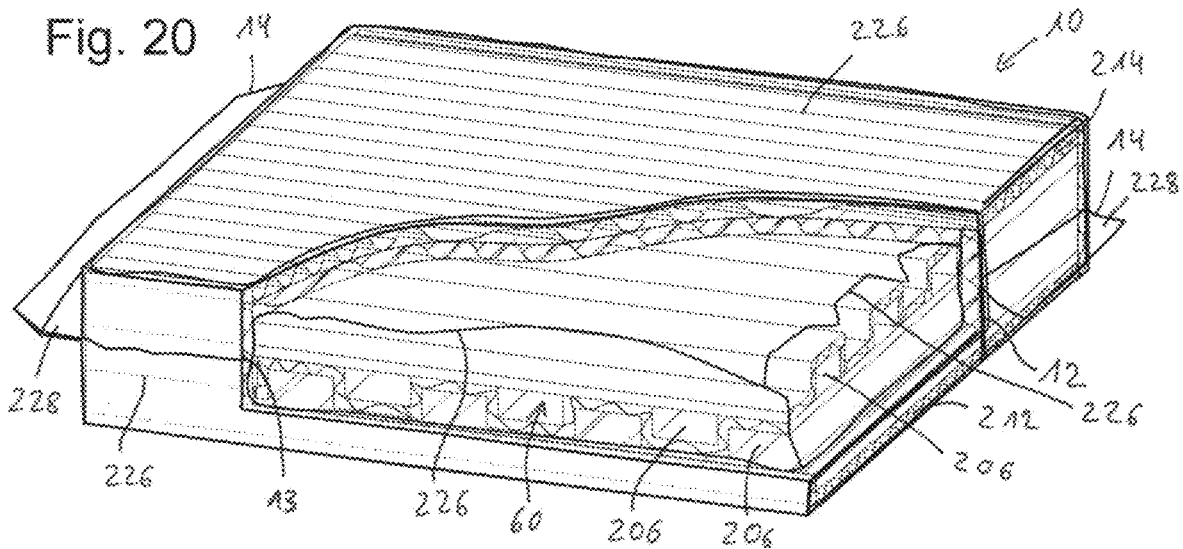

FIG. 16 a partially cross-sectional, perspective view of a vacuum insulated case according to another embodiment of the present disclosure, FIG. 17 a partially cross-sectional, perspective view of a vacuum insulation panel according to another embodiment of the present disclosure, FIG. 18 a partially cross-sectional, perspective view of a vacuum insulation panel according to another embodiment of the present disclosure, FIG. 19 a partially cross-sectional, perspective view of an improvement of the vacuum insulation panel from FIG. 18, FIG. 20 a partially cross-sectional, perspective view of a vacuum insulation panel according to another embodiment of the present disclosure.

DETAILED DESCRIPTION

Figure 1:
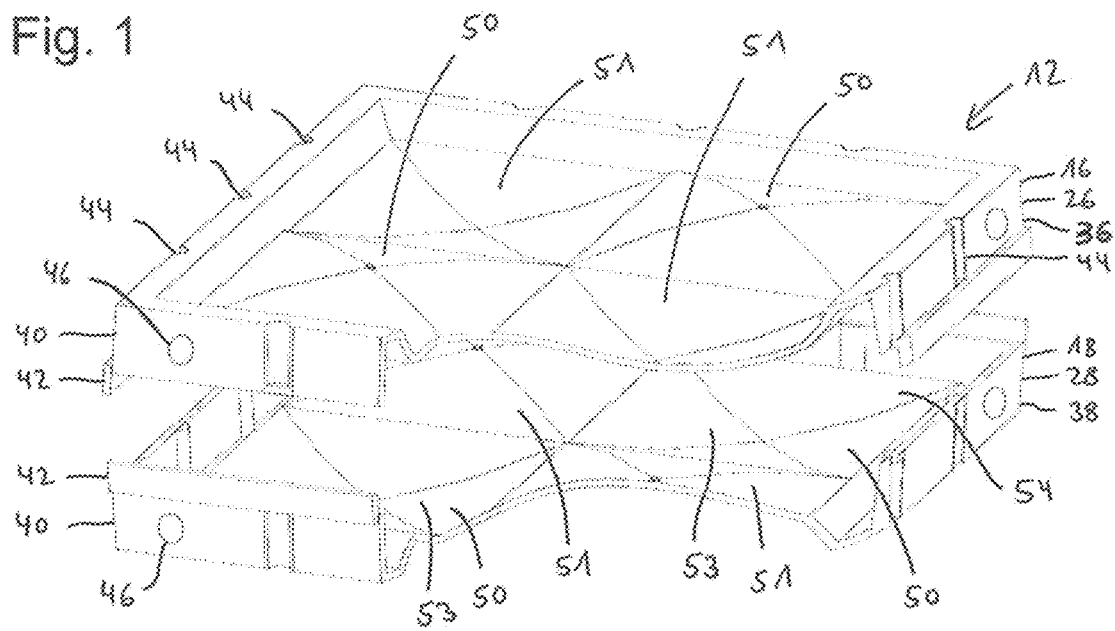
FIG. 1 a partially cross-sectional, perspective, exploded view of a core according to a first embodiment of the present disclosure, FIG. 2 a partially cross-sectional, perspective view of a vacuum insulation panel with the core from FIG. 1, FIG. 3 a cross-sectional view through the vacuum insulation panel from FIG. 2 (not to scale), FIG. 4 a partially cross-sectional, perspective view of a vacuum insulation panel according to another embodiment of the present disclosure, FIG. 5 a cross-sectional view through the vacuum insulation panel from FIG. 4, FIG. 6 a cross-sectional view through vacuum insulated packaging according to another embodiment of the present disclosure, FIG. 7 a cross-sectional view through vacuum insulated packaging according to another embodiment of the present disclosure, FIG. 8 a partially cross-sectional, perspective view of vacuum insulated packaging according to another embodiment of the present disclosure, FIG. 9 a side view of vacuum insulated packaging according to another embodiment of the present disclosure, FIG. 10 a partially cross-sectional, perspective view of vacuum insulated packaging according to another embodiment of the present disclosure, FIG. 11 a side view of a vacuum insulation panel according to another embodiment of the present disclosure, FIG. 12 a side view of a vacuum insulation panel according to another embodiment of the present disclosure, FIG. 13 a perspective view of two vacuum insulation panels for constructing a box-shaped* vacuum insulator according to another embodiment of the present disclosure, FIG. 14 a partially cross-sectional, perspective, exploded view of a box-shaped* vacuum insulator, FIG. 15 a partially cross-sectional, perspective view of a vacuum insulated case with the box-shaped* vacuum insulator from FIG. 14 and an inner box and outer shipping box.
Figure 2:
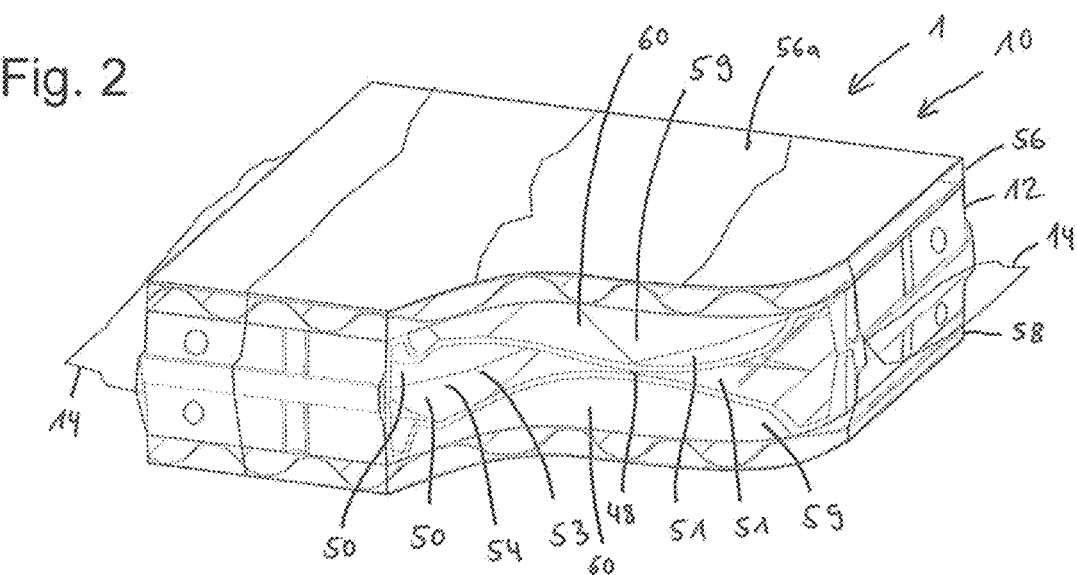
Figure 3:
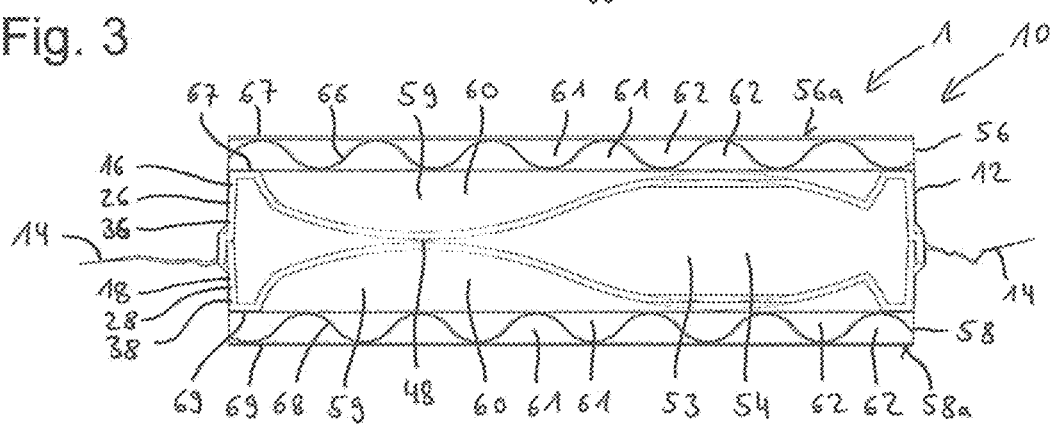

With reference to FIGS. 1 to 3, the vacuum insulation element 1 is implemented in the form of a vacuum insulation panel 10, the core 12 of which is made of a first and a second plate element 16, 18. The first and second plate elements 16, 18 in this example are implemented as a first or second molded plastic part 26, 28 in the form of two inversely, three-dimensionally shaped plastic layers 36, 38. The three-dimensionally shaped plastic layers 36, 38 can be produced from a flat plastic layer or plate, for example 1 mm thick unfoamed polystyrene, for example by embossing or deep-drawing. The molded plastic parts 26, 28 each have a surrounding edge 40, which interlocks with the complementary mating part via retaining strips 42 when the two molded plastic parts 26, 28 are fitted into one another. The surrounding edge 40 additionally has semicylindrical embossed features 44, which reinforce the molded plastic parts 26, 28, as well as openings 46 to be able to evacuate the interior insulation volume 54 well when the two molded plastic parts 26, 28 are fitted into one another.

On their surfaces, the two shaped molded plastic parts 26, 28 have a plurality of recesses, in this example, dome-shaped recesses 50, 51 on both sides, which inversely oppose one another in the interior insulation volume 54 in order to form a plurality of cavities 53 between the outward-facing recesses 50, which cavities communicate with one another. The mutually opposing inward-facing recesses 51 mutually support one another at points of support 48 (see FIG. 3). For additional support of the vacuum insulation panel 10, the core 12 is also covered on both sides with a sheet of corrugated cardboard 56, 58, which firstly forms an additional evacuatable insulation volume 60 in cavities 59 between the molded plastic parts 26, 28 and the corrugated cardboard 56, 58, and secondly forms an additional evacuatable insulation volume 62 in cavities 61 within the two corrugated cardboard sheets 56, 58. The cavities 61 or the insulation volume 62 within the corrugated cardboard 56, 58 are formed and maintained in stable fashion by the wave-shaped interior corrugated cardboard layers 66, 68 between the liners 67, 69.

Then the entire core 12 consisting of the molded plastic parts 26, 28, and the corrugated cardboard 56, 58 is inserted in an air-tight or vacuum-tight enclosure 14 made of plastic sheeting, for example a plastic tube. Next, the plastic sheeting or foil enclosure 14 is evacuated with a vacuum sealer and then sealed. Simple, small vacuum sealers, in particular roll vacuum sealers for kitchen use, are commercially available with corresponding plastic bags/plastic sheeting.

The plastic sheeting for the enclosure 14 certainly can also be metal-coated (not shown) in order to reduce thermal radiation, wherein a metal coating on the inner side is appropriate. Alternatively, or in addition, the core 12, thus in this example the outer surfaces 56a, 58a of the corrugated cardboard 56, 58, can be metal-coated (not shown).

Figure 4:
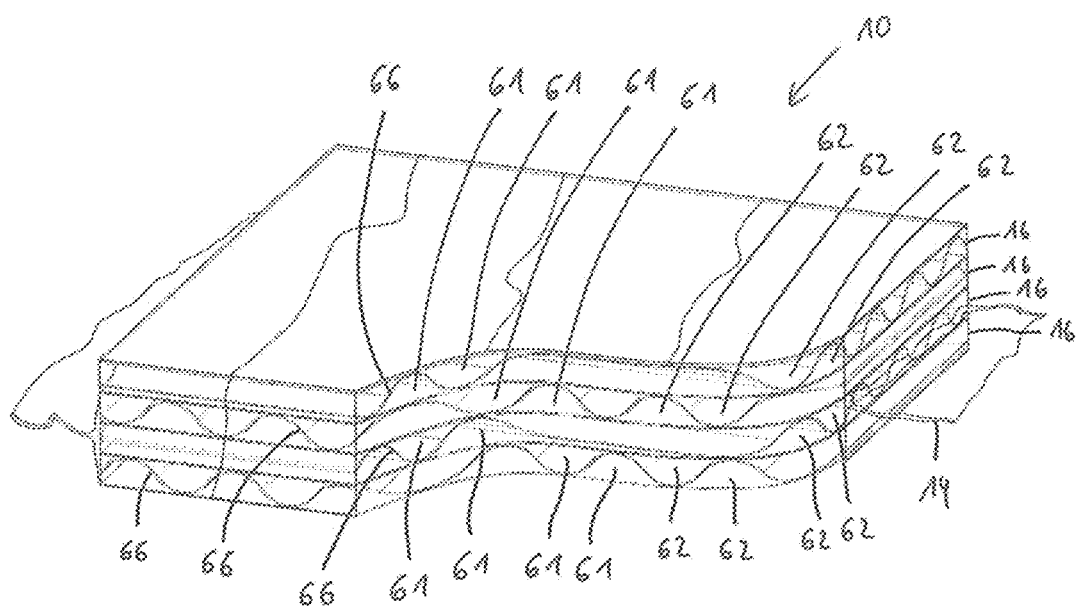
Figure 5:
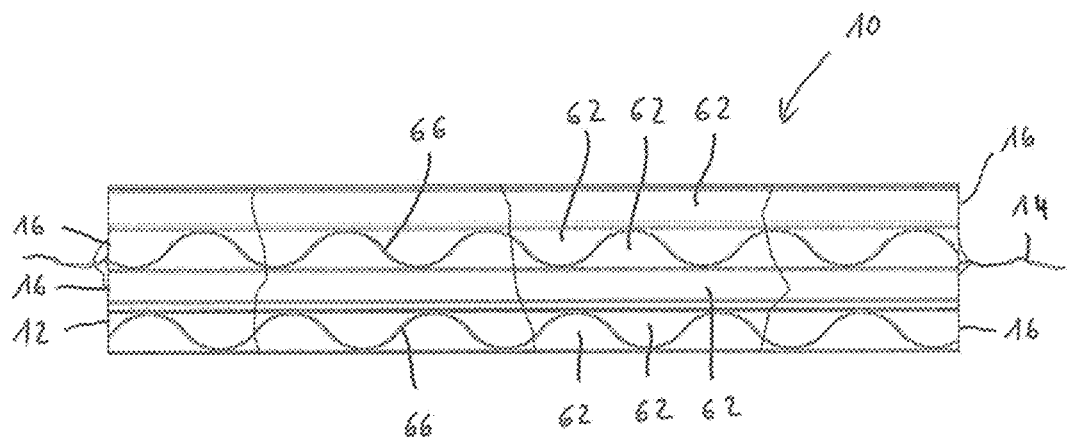
Figure 12:
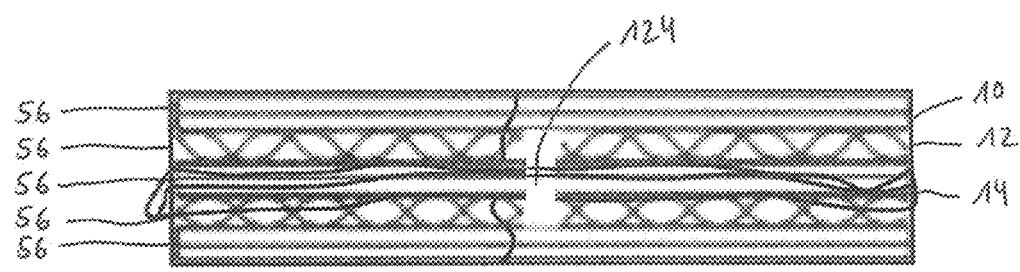
Figure 13:
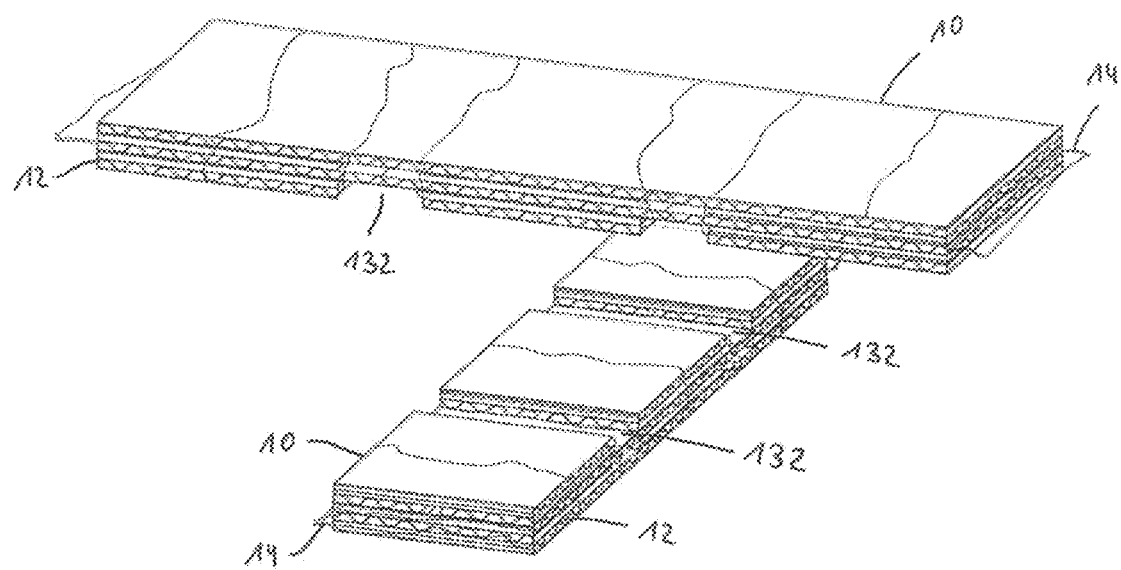
Figure 14:
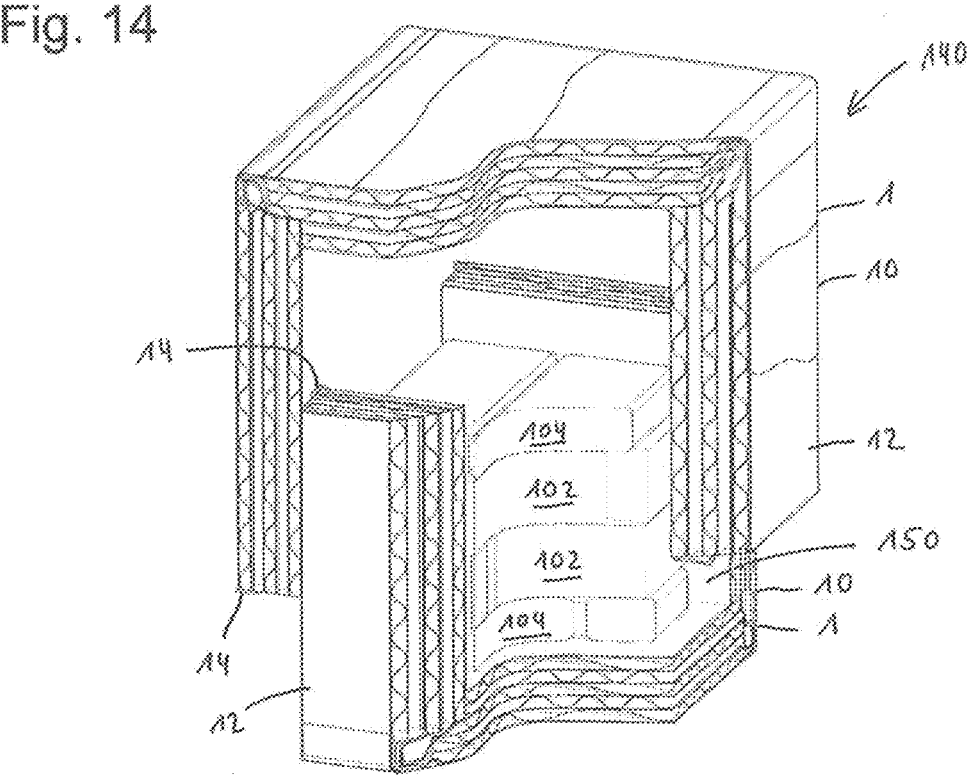

With reference to FIGS. 4 and 5, another embodiment of the present disclosure of the vacuum insulation panel 10 is shown, wherein the flat core 12 consists exclusively of plate elements 16 made of structural cardboard in the form of corrugated cardboard 56, in this example of four layers of lined corrugated cardboard 56. The core 12 consisting of these four lined corrugated cardboard sheets 56 is in turn heat-sealed in the plastic sheeting or foil enclosure 14 and evacuated therein. Testing has shown that commercial lined corrugated cardboard 56, in particular lined corrugated cardboard 56 with relatively small flute structures, is already sufficiently stable to maintain the insulation volume 62, which is formed between the corrugated layers 66 of the corrugated cardboard 56 between the liners 67 in the form of the cavities 61, in a stable manner in the evacuated state. In the present example, stability is further increased by criss-cross laying of the corrugated cardboard sheets 56. The communication of the individual cavities 61 can take place at the faces of the corrugated cardboard sheets 56, but gaps running transversely to the corrugated layer can also be provided in the layers of corrugated cardboard 56 (see FIGS. 9, 12) to improve the communication. Alternatively, honeycomb cardboard sheets can also be used as long as communication between the individual cells is ensured.

Figure 6:
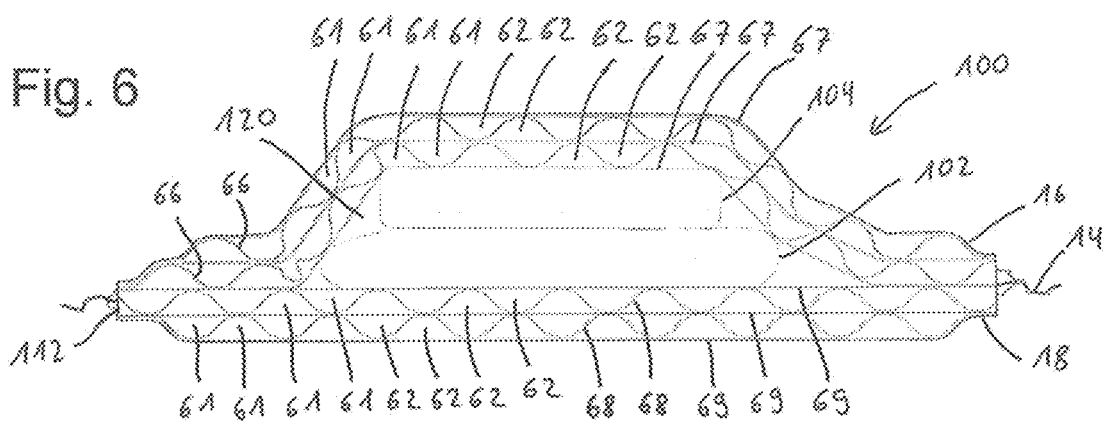

With reference to FIG. 6, vacuum insulated packaging 100 is shown in which temperature-sensitive contents 102, for example steak, and a cold pack 104 are encapsulated. The vacuum insulated packaging 100 consists of top and bottom platelike elements 16, 18, which in turn each consist of two layers of corrugated cardboard 56, 58. The packaging core 112 in this example accordingly consists of a total of four layers of corrugated cardboard 56, 58, and defines an evacuated effective volume 120 between the two plate elements 16, 18 as well as an evacuated insulation volume 62 within the platelike elements 16, 18 formed by the cavities 61 between the corrugated layers 66, 68 and the liners 67, 69 of the corrugated plates 56, 58.

To manufacture the vacuum insulated packaging 100, the contents 102 and the cold pack 104 are arranged between the two platelike elements 16, 18 in the manner of a sandwich, and then the entire arrangement in the plastic sheeting or foil enclosure 14 is evacuated, and this is then sealed. In the process, the top platelike element 16, consisting of two corrugated cardboard layers 56, which in this example are not laid cross-cross fashion, largely conforms to the shape of the contents 102 and the cold pack 104 so that a sandwich-like vacuum insulated package 100 for the contents 102 and the cold pack 104 is formed, wherein the contents 102 and the cold pack 104 are also vacuum-sealed at once in the same step. In other words, in the evacuated state, the contents 102 and the cold pack 104 are located in the evacuated effective volume 120.

Figure 7:
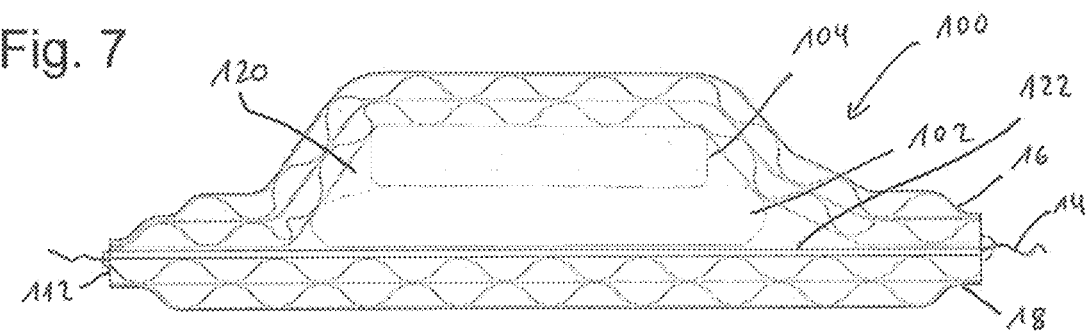

With reference to FIG. 7, a stiffening intermediate layer 122 can additionally be arranged beneath the contents, so that, among other reasons, the bottom platelike element 18 remains flat. Otherwise, the embodiment in FIG. 7 corresponds to the embodiment in FIG. 6.

Figure 8:
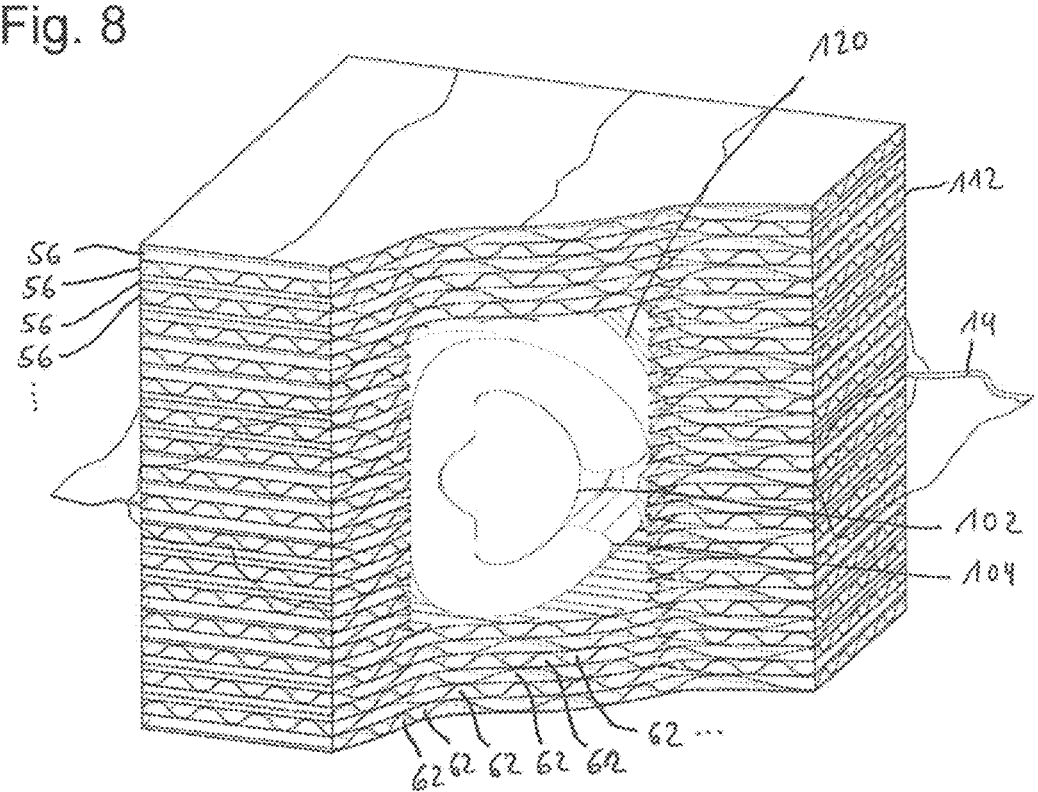

With reference to FIG. 8, a packaging core 112 is shown that is made of a plurality of corrugated cardboard sheets 56, wherein a majority of the interior corrugated cardboard sheets 56 are internally die-cut in order to form a defined, evacuatable effective volume 120 in which the contents 102 are arranged with a cold pack 104, in this example implemented as a soft gel pad. In contrast to the embodiments in FIGS. 6 and 7, the packaging core 112 in this exemplary embodiment is designed to be so stable that the effective volume 120 is kept stable and essentially unchanged when the packaging core 112 in the plastic sheeting or foil enclosure 14 is evacuated. As a result, essentially no external force caused by atmospheric pressure presses on the contents 102, unlike in the embodiments in FIGS. 6 and 7, so that even sensitive contents 102 such as, for example, a glass bottle, can be packaged in a vacuum insulated manner. The packaging core 112 in this example accordingly fulfills a three-fold function, which is to say, firstly, definition of the stable, evacuated effective volume 120, secondly, definition of the evacuated insulation volume 62 within the corrugated cardboard sheets 56, and thirdly, a shock-absorbing packaging of the contents 112.

Figure 9:
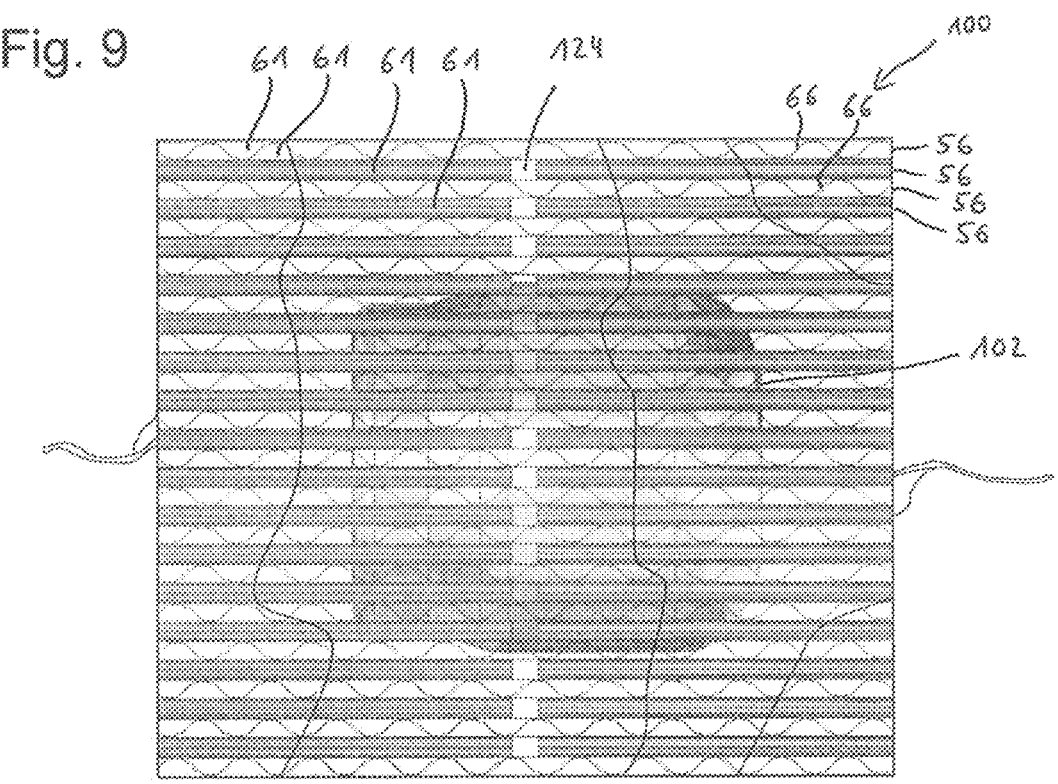

With reference to FIG. 9, a similar embodiment as in FIG. 8 is shown, in which a glass container is vacuum-sealed as contents 102 in the vacuum insulation packaging 100. The corrugated cardboard layers 56, or at least their corrugated layers 66, are recessed in the center region so that a gap 124 is produced through which the channel-like cavities 61 can better communicate, even when the sheeting or foil enclosure 14 has already been drawn against the faces of the core 12 or the packaging core 112 where the cavities 61 likewise communicate with one another. As a result, the evacuation of the plurality of layers made of corrugated cardboard 56 can be accelerated.

Figure 10:
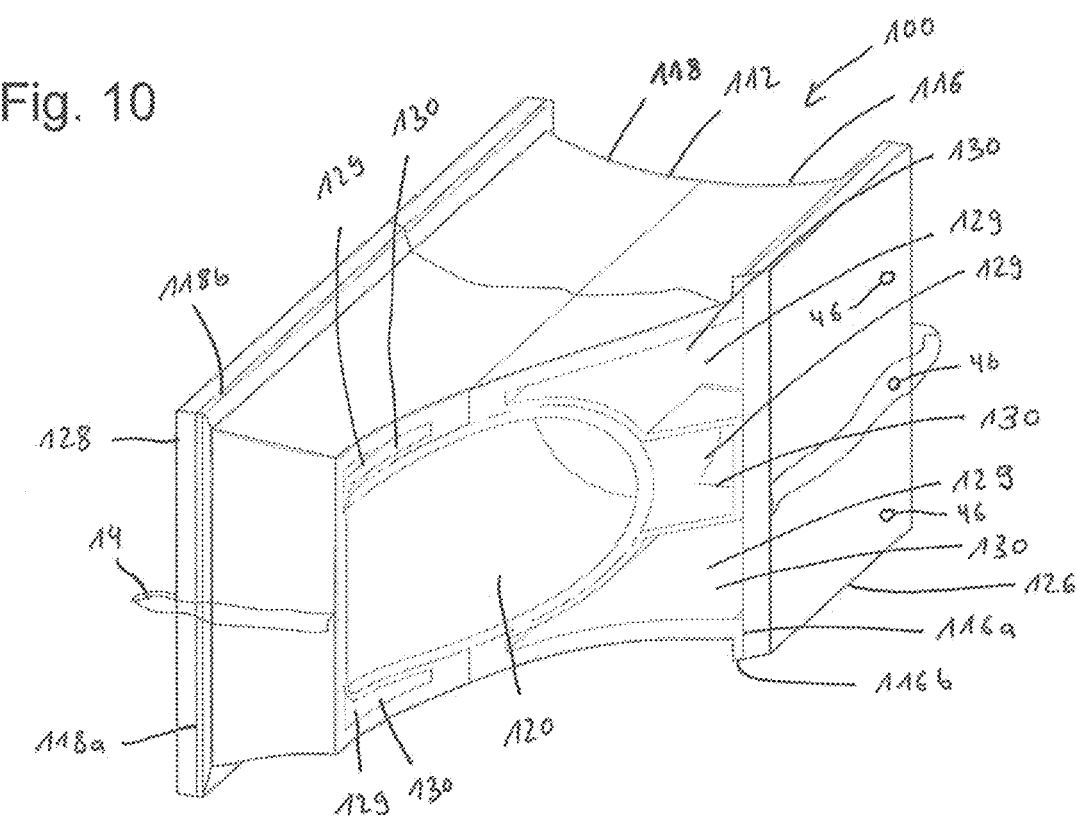
Figure 11:
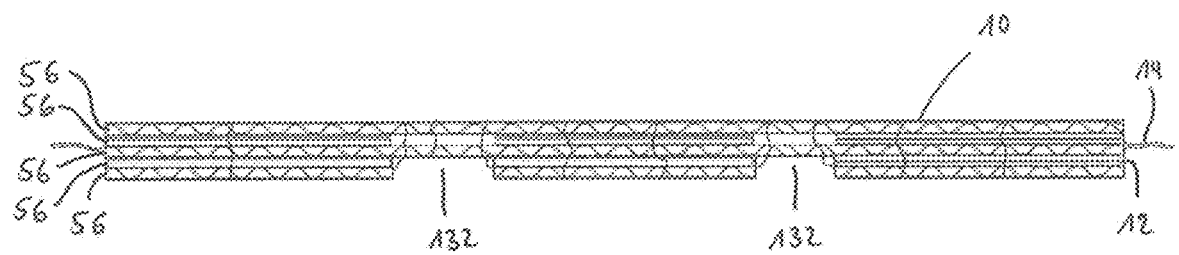

With reference to FIG. 10, the vacuum insulation packaging 100 includes a packaging core 112 that includes two molded plastic parts 116, 118 in the form of plastic half shells. The shaped plastic half shells form the evacuated effective volume 120 and also, with cavities 129, the evacuated insulation volume 130. The two shaped plastic half shells 116, 118 are open at the applicable outer sides 116*a*, 118*a*, and have, around the applicable opening, a surrounding stabilizing edge 116*b*, 118*b* on each of which a cover plate 126, 128 rests. The cover plates 126, 128 have openings 46 for ventilation during evacuation. In the evacuatable, stable effective volume 120, contents that are sensitive to shock, such as, e.g., a medicine bottle or the like, can once again be transported in a vacuum-insulated and shock-protected manner once the core 112 with the contents 102 is vacuum-sealed in the sheeting or foil enclosure 14.

With reference to FIGS. 11 to 14, a vacuum insulated case 200 can be constructed from the vacuum insulation panels 10. For this purpose, two vacuum insulation panels 10, for example, are produced, each having a core 12 made of—in this example—five layers of corrugated cardboard 56. A portion of the corrugated cardboard layers 56, in the present example the two bottom corrugated cardboard layers, are recessed at fold lines 132. Consequently, after evacuation and heat-sealing of the core 12 in the plastic sheeting or foil enclosure 14, the vacuum insulation panel 10 can be folded into a U-shape at the predefined fold lines 132 relatively precisely in the evacuated state (see FIG. 14). Still referring to FIG. 14, two such vacuum insulation panels 10 folded into U-shapes can then be assembled into a cube-shaped or box-shaped vacuum insulator 140 when rotated by 90°. The box-shaped vacuum insulator 140 thus formed, in turn forms—in this example—a non-evacuated effective volume 150, in which the contents 102 with cold packs 104 can be arranged, insulated by the evacuated layers of corrugated cardboard 56, and thus be transported in a thermally insulated manner. Alternatively, to the cold packs 104, it is also possible to use a heat reservoir if the contents 102 are to be transported with temperature control involving heating rather than cooling.

Figure 15:
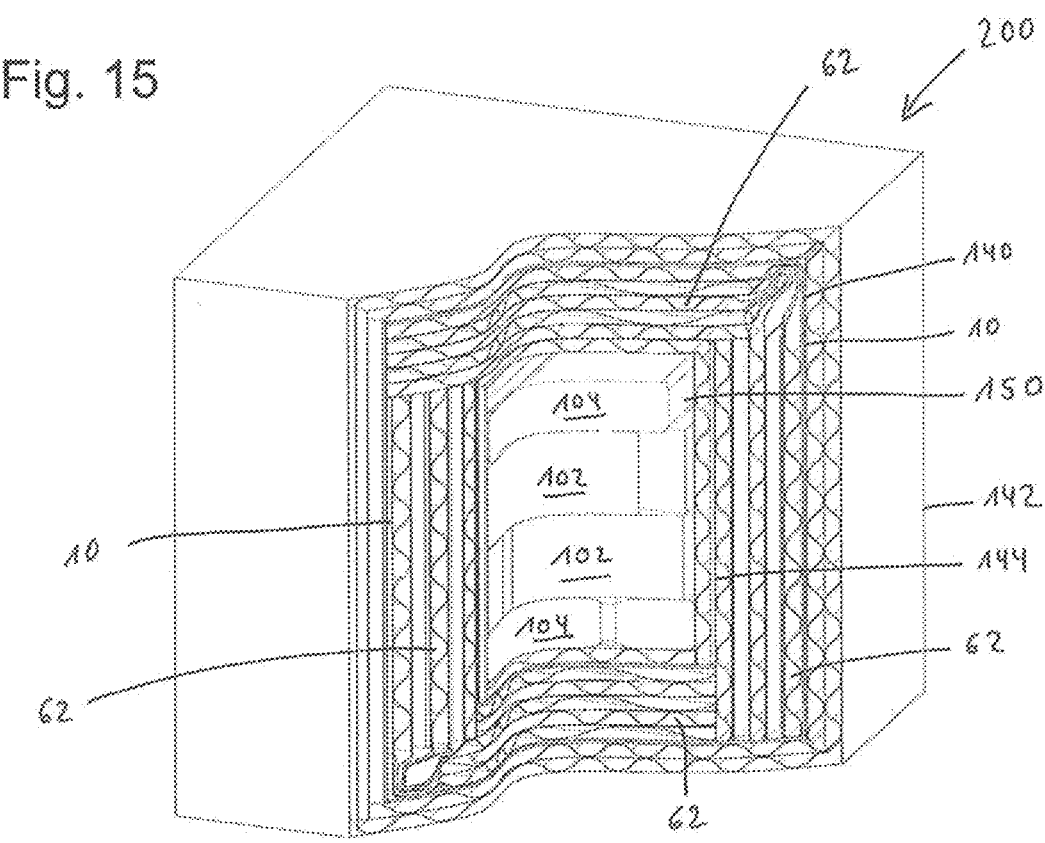

With reference to FIG. 15, the box-shaped vacuum insulator 140 can be placed in an outer shipping box 142, and an inner box 144 that defines the non-evacuated effective volume 150 can be placed inside the box-shaped vacuum insulator 140. The outer shipping box 142 and the inner box 144 here are, for example, ordinary boxes made of corrugated cardboard and are not heat-sealed and not evacuated.

With reference to FIG. 16, another embodiment of a vacuum insulated case 200 is shown in which a bottle as contents 102 is surrounded on all sides by vacuum insulation panels 10. Here, too, the vacuum insulation panels 10 together form a box-shaped vacuum insulator 140 surrounding the non-evacuated effective volume 150. The box-shaped vacuum insulator 140 is likewise placed in a shipping box 142. Instead of layers of corrugated cardboard, the vacuum insulation panels 10 used in this example employ two shaped plastic layers 156, 158 in the form of so-called dimpled membrane, such as is used in the construction industry as wall drainage, for example. Such dimpled membrane can be obtained commercially as roll goods in the construction industry and is extremely economical. The shaped plastic layers 166, 168 formed by the dimpled membrane 156, 158 have inward-facing recesses 171 that mutually support one another. Due to the use of at least two dimpled membranes 156, 158, a plurality of cavities 173 between the two dimpled membranes 156, 158 are formed by the outward-facing recesses 170 between the dimpled inward-facing recesses 171, and a plurality of cavities 183 between the dimpled membranes 156, 158 and the sheeting or foil enclosure 14 are formed in the dimpled inward-facing recesses 171. These cavities 173, 183 form evacuatable insulation volumes 174, 184 of the flat core 12 formed by the two dimpled membranes 156, 158.

With reference to FIG. 17, another embodiment of the vacuum insulation panel 10 as a thermal insulating panel has, for example, at each of two face ends 10*a*, a mounting strip 192 that is also heat-sealed in the plastic sheeting or foil enclosure 14. Accordingly, heat-seal seams 194 are located between the evacuated core 12 and the applicable mounting strip 192, and additional heat-seal seams 196 are located at the outer edges of the mounting strips 192 that are inserted into the plastic sheeting or foil enclosure 14. The mounting strips 192 can be folded over at the heat-seal seams 194 so that the vacuum insulation panel 10 can be fastened at its face in a manner involving penetration at locations 198, for example at opposite ends between two roof beams 199, without breaking the vacuum within the vacuum insulation panel 10. This design is applicable for use in the construction industry, for example for insulating roofs or facades of buildings. In particular, it can also be beneficial here to encapsulate the enclosure in an additional enclosure, and if applicable also to evacuate the additional (sheeting) enclosure so that the core is encapsulated in two nested (sheeting) enclosures evacuated independently of one another.

Connecting channels 176 can be provided between the inward-facing dimples or recesses 171 so that the inward-facing dimples or recesses 171 can still communicate with one another even when the sheeting or foil enclosure 14 has already been drawn by vacuum against the outward-facing recesses 170.

With the embodiments in FIGS. 4 to 9 and 11 to 17, it is especially desirable that the user can assemble them himself on site when packaging the contents 102. To do so, the user cuts the core 12 or the packaging core 112 to the desired shape and size, for example with a knife or scissors, inserts the core 12 or packaging core 112 in the sheeting or foil enclosure 14, and evacuates and seals the enclosure 14 with a vacuum sealer. The plate elements 16, 18 of the core 12 or packaging core 112 are accordingly made for cutting with a knife or scissors.

With reference to FIG. 18, a vacuum insulation panel 10 is shown in which the core 12, which consists of a shaped part 13, is heat-sealed in a sheeting or foil enclosure 14 and evacuated. The shaped part 13 consists of strips 202 of corrugated cardboard, in this example corrugated cardboard with a B flute and lined on both sides, that are slotted together crosswise. The strips 202 are slotted in alternation in order to be assembled into a checkerboard-like partition 204. The partition 204 forms cuboid spaces that form unfilled cavities 206, which is to say remain hollow, and form the evacuated cavities together with the cavities within the corrugated cardboard strips 202 and the other corrugated cardboard. The shaped part 13 is further stabilized over its area by a top and a bottom outer layer 212, 214. The outer layers 212, 214 also prevent the sheeting or foil enclosure 14 from being drawn into the spaces or cavities 206 of the partition 204. In like manner, the faces 216 of the shaped part 13 are covered with additional corrugated cardboard face strips 218. The shaped corrugated cardboard part 13 thus formed is sufficiently dimensionally stable to be evacuated in the sheeting or foil enclosure 14.

With reference to FIG. 19, the faces 216 of the shaped part 13 can be additionally stabilized with surrounding strips that are parallel to the plane of the shaped part, likewise made of corrugated cardboard, for example. For this purpose, additional corrugated cardboard strips 222 are slotted and inserted parallel to the plane of the shaped part into the likewise slotted faces 216 of the shaped part 13 in order to form a surrounding stabilizing edge 224.

With reference to FIG. 20, the corrugated cardboard can also be folded in a meander pattern in order to create additional unfilled cavities 206 between the plate elements 16, 18.

To shorten the evacuation time, a ribbed plastic sheeting, for example with embossed grooves, can be used for the sheeting or foil enclosure 14. However, it has also been demonstrated that an air-permeable fiber mat 226 between the plate elements and the sheeting or foil enclosure can facilitate evacuation. The use of a plastic fiber mat, made of polyethylene, for example, is especially desirable. A heat-sealable fiber mat 226 of this nature can even extend into the sealed edge 228 of the sheeting or foil enclosure 14 between the top and bottom sheets of the sheeting or foil enclosure, and be sealed along with the sheeting or foil enclosure after evacuation.

A fiber mat 226 between the plate elements and the sheeting or foil enclosure, in particular a fiber mat that can be sealed to the sheeting of the sheeting or foil enclosure, can be desirable in all embodiments.

The vacuum insulation element or panel according to the present disclosure is suitable not only for thermal insulation, but can also be used as acoustic insulation. Among other things, it can be used as a component of a room divider, for example together with a planted trellis. Another application as an acoustic insulation panel is possible in loudspeaker boxes, for example in order to change the frequency spectrum of the loudspeaker box.

It is evident to a person skilled in the art that the embodiments described above should be considered as examples, and that the present disclosure is not limited thereto, but instead can be varied in multiple ways without departing from the protective scope of the claims. Furthermore, it is evident that, regardless of whether the features are disclosed in the description, the claims, the figures, or elsewhere, they also define desirable parts of the present disclosure singly, even if they have been described in combination with other features. In particular, the features disclosed in conjunction with the vacuum insulation element are also considered as disclosed for the vacuum insulated packaging and the vacuum insulated case, and vice-versa.

The invention claimed is:

1. Vacuum insulation element comprising a core and a flexible, vacuum-tight sheeting enclosure,
   wherein the core is encapsulated in the sheeting enclosure in a vacuum-tight manner, and the sheeting enclosure with the core is evacuated, and the core is dimensionally stable at least to the extent that, in the evacuated state, it maintains an evacuated insulation volume inside the sheeting enclosure in opposition to the atmospheric pressure that presses on the sheeting enclosure,
   wherein the core is composed of a shaped part made of one or more plate elements, and the shaped part has a plurality of cavities, wherein
   i) in the case of one plate element, the cavities are formed by a shape-giving structure within the plate element and/or between recesses in the shape-giving structure of the plate element and the sheeting enclosure, or
   ii) in the case of multiple plate elements, the cavities are formed by a shape-giving structure within the plate elements, between the plate elements, and/or between recesses in the shape-giving structure of the plate elements and the enclosure,
   wherein the cavities in the shaped part are unfilled and the evacuated insulation volume maintained by the core is composed of the unfilled cavities, and wherein the shaped part provides the core with adequate dimensional stability to withstand atmospheric pressure without the cavities being filled with a material that can be evacuated or is porous,
   wherein at least one of the plate elements is in the form of a shaped plastic layer that is covered on at least one side by a board, acting as a pressure relief and pressure distribution layer for the shaped plastic layer,
   wherein the arrangement made of the plate element or elements is not itself vacuum-tight, and the cavities communicate with one another at least during evacuation in order to be evacuated together within the sheeting enclosure,
   wherein an air-permeable fiber mat is provided between at least one of the one or more plate elements and the sheeting enclosure, and
   wherein the air-permeable fiber mat is made of a heat-sealable material and extends into an edge region of the sheeting enclosure, and the heat-sealable air-permeable fiber mat is sealed between a top and bottom sheet of the sheeting enclosure in the edge region of the sheeting enclosure.

2. Vacuum insulated packaging, comprising at least one vacuum insulation element according to claim 1.

3. Vacuum insulation element according to claim 1, wherein the air-permeable fiber mat is made of polyethylene.

4. Vacuum insulation element comprising a core and a flexible, vacuum-tight sheeting enclosure,
   wherein the core is encapsulated in the sheeting enclosure in a vacuum-tight manner, and the sheeting enclosure with the core is evacuated, and the core is dimensionally stable at least to the extent that, in the evacuated state, it maintains an evacuated insulation volume inside the sheeting enclosure in opposition to the atmospheric pressure that presses on the sheeting enclosure,
   wherein the core comprises at least one layer of corrugated cardboard defining a plurality of cavities within the at least one layer of corrugated cardboard,
   wherein the cavities are unfilled and the evacuated insulation volume maintained by the core is composed of the unfilled cavities,
   wherein the at least one layer of corrugated cardboard provides the core with adequate dimensional stability to withstand atmospheric pressure without the cavities being filled with a material that can be evacuated or is porous,
   wherein the core comprising the at least one layer of corrugated cardboard is not itself vacuum-tight, and the cavities communicate with one another at least during evacuation in order to be evacuated together within the sheeting enclosure,
   wherein an air-permeable fiber mat is provided between at least one layer of corrugated cardboard and the sheeting enclosure, and wherein the air-permeable fiber mat is made of a heat-sealable material and extends into an edge region of the sheeting enclosure and the heat-sealable air-permeable fiber mat is sealed between a top and bottom sheet of the sheeting enclosure in the edge region of the sheeting enclosure.

5. Vacuum insulated packaging, comprising at least one vacuum insulation element according to claim 4.

6. Vacuum insulation element according to claim 4, wherein the air-permeable fiber mat is made of polyethylene.

7. Vacuum insulation element comprising a core and a flexible, vacuum-tight sheeting enclosure,
wherein the core is encapsulated in the sheeting enclosure in a vacuum-tight manner, and the sheeting enclosure with the core is evacuated, and the core is dimensionally stable at least to the extent that, in the evacuated state, it maintains an evacuated insulation volume inside the sheeting enclosure in opposition to the atmospheric pressure that presses on the sheeting enclosure,
wherein the core comprises
a first layer of corrugated cardboard,
a plurality of strips of corrugated cardboard being assembled into a checkerboard-like partition defining a plurality of cavities within the checkerboard-like partition, and
a second layer of corrugated cardboard,
wherein the first layer of corrugated cardboard is positioned on top of the checkerboard-like partition and the second layer of corrugated cardboard is positioned on a bottom of the checkerboard-like partition, for stabilizing the checkerboard-like partition over its area by said first and second layer of corrugated cardboard preventing the sheeting enclosure from being drawn into the cavities of the checkerboard-like partition,
wherein the cavities are unfilled and the evacuated insulation volume maintained by the core is composed of the unfilled cavities, and wherein the checkerboard-like partition stabilized by the first and second layers of corrugated cardboard provides the core with adequate dimensional stability to withstand atmospheric pressure without the cavities being filled with a material that can be evacuated or is porous, and
wherein the core is not itself vacuum-tight, and the cavities communicate with one another at least during evacuation in order to be evacuated together within the sheeting enclosure.

8. Vacuum insulated packaging, comprising at least one vacuum insulation element according to claim 7.

9. Vacuum insulation element according to claim 7, wherein the core has edge faces and the edge faces of the core are stabilized with surrounding strips made of corrugated cardboard.

10. Vacuum insulation element according to claim 7, wherein an air-permeable fiber mat is provided between the core and the sheeting enclosure.

11. Vacuum insulation element according to claim 10, wherein the air-permeable fiber mat is made of a heat-sealable material and extends into an edge region of the sheeting enclosure and the heat-sealable air-permeable fiber mat is sealed between a top and bottom sheet of the sheeting enclosure in the edge region of the sheeting enclosure.

12. Vacuum insulation element according to claim 11, wherein the air-permeable fiber mat is made of polyethylene.

* * * * *